(12) United States Patent
Cole et al.

(10) Patent No.: US 11,087,344 B2
(45) Date of Patent: Aug. 10, 2021

(54) METHOD AND SYSTEM FOR PREDICTING AND INDEXING REAL ESTATE DEMAND AND PRICING

(71) Applicant: ADP, LLC, Roseland, NJ (US)

(72) Inventors: Ramsay Cole, New York, NY (US); Debashis Ghosh, Charlotte, NC (US); Kurt Newman, Alpharetta, GA (US)

(73) Assignee: ADP, LLC, Roseland, NJ (US)

( * ) Notice: Subject to any disclaimer, the term of this patent is extended or adjusted under 35 U.S.C. 154(b) by 201 days.

(21) Appl. No.: 16/383,250

(22) Filed: Apr. 12, 2019

(65) Prior Publication Data
US 2020/0327565 A1 Oct. 15, 2020

(51) Int. Cl.
G06Q 30/02 (2012.01)
G06N 20/00 (2019.01)
G06Q 50/16 (2012.01)

(52) U.S. Cl.
CPC ......... G06Q 30/0205 (2013.01); G06N 20/00 (2019.01); G06Q 30/0206 (2013.01); G06Q 50/16 (2013.01)

(58) Field of Classification Search
None
See application file for complete search history.

(56) References Cited

U.S. PATENT DOCUMENTS

| 2011/0066561 A1* | 3/2011 | Lazarre | G06Q 50/16 705/313 |
| 2012/0330715 A1 | 12/2012 | Malaviya et al. | |
| 2014/0257924 A1* | 9/2014 | Xie | G06Q 10/067 705/7.31 |
| 2015/0112879 A1* | 4/2015 | Ghosh | G06Q 10/10 705/313 |
| 2015/0242747 A1* | 8/2015 | Packes | G06Q 50/16 706/17 |
| 2015/0324939 A1* | 11/2015 | Malaviya | G06Q 50/16 705/14.66 |
| 2016/0232545 A1* | 8/2016 | Shuken | G06Q 30/0205 |
| 2017/0091627 A1* | 3/2017 | Terrazas | G06F 16/50 |

(Continued)

OTHER PUBLICATIONS

Ghysels et al., "Forecasting Real Estate Prices," Jul. 1, 2012, 90 pages.

(Continued)

*Primary Examiner* — Dennis W Ruhl
*Assistant Examiner* — Donald J Edmonds
(74) *Attorney, Agent, or Firm* — Yee & Associates, P.C.

(57) ABSTRACT

A method, computer system, and computer program product that aggregates sample data regarding a plurality of factors associated with employment and geographic location; performs iterative analysis on the sample data using machine learning to construct a predictive model; populates, using the predictive model, a database with predicted values of real estate demand for a selected set of predefined geographic regions; converts the predicted values of real estate demand in the database into percentages of observed values of real estate demand for geographic regions within the selected set over a specified time period to create indices of real estate demand; and rank orders the geographic regions within the selected set according to their indices of real estate demand.

18 Claims, 7 Drawing Sheets

(56) References Cited

U.S. PATENT DOCUMENTS

2017/0236226 A1* 8/2017 Malaviya ............... G06N 7/005
                                                   706/45
2018/0150926 A1* 5/2018 Darden .............. G06Q 30/0278
2018/0158011 A1* 6/2018 Barlow .......... G06Q 10/063112
2018/0293676 A1* 10/2018 Xie ....................... G06F 16/901

OTHER PUBLICATIONS

Guirguis et al., "Forecasting Office Space Demand," NAIOP Research Foundation, Jan. 2016, 24 pages.

* cited by examiner

METHOD AND SYSTEM FOR PREDICTING
AND INDEXING REAL ESTATE DEMAND
AND PRICING

BACKGROUND INFORMATION

1. Field

The present disclosure relates generally to an improved computer system and, in particular, to a method and apparatus for machine learning predictive modeling. Still more particularly, the present disclosure relates to a method and apparatus for predicting real estate demand based on geography.

2. Background

The presence of corporations within a geographic region influences the demand and valuation of real estate within the geographic region. Employment changes for companies within a geographic region affect the demand for real estate within the geographic region. For example, increasing a quantity of employees in a geographic region will increase demand for housing. Increasing a quantity of employees in a geographic region may also increase demand for goods and services provided by local businesses, affecting demand for retail spaces.

Additionally, the changes in quantities of different job types within a geographic region may result in a change in the demand for specific types of real estate. An increase or decrease in the quantity of higher salaried employees may result in a different real estate demand than an increase or decrease in lower salaried or hourly employees.

Demand for real estate influences real estate pricing. As demand increases, prices also increase. Decreasing demand also decreases pricing for real estate.

Therefore, it would be desirable to have a method and system that provides predictive modeling and indices that predict a demand for real estate within a geographic region.

SUMMARY

An embodiment of the present disclosure provides a computer-implemented method for predictive modeling. The computer system aggregates sample data regarding a plurality of factors associated with employment and geographic location and performs iterative analysis on the sample data using machine learning to construct a predictive model. The computer system then populates, using the predictive model, a database with predicted values of real estate demand for a selected set of predefined geographic regions. The computer system converts the predicted values of real estate demand in the database into percentages of observed values of real estate demand for geographic regions within the selected set over a specified time period to create indices of real estate demand. The computer system then rank orders the geographic regions within the selected set according to their indices of real estate demand.

Another embodiment of the present disclosure provides a machine learning predictive modeling system comprising a computer system and one or more processors running on the computer system. The one or more processors aggregate sample data regarding a plurality of factors associated with employment and geographic location; perform iterative analysis on the sample data using machine learning to construct a predictive model; populate, using the predictive model, a database with predicted values of real estate demand for a selected set of predefined geographic regions; convert the predicted values of real estate demand in the database into percentages of observed values of real estate demand for geographic regions within the selected set over a specified time period to create indices of real estate demand; and rank order the geographic regions within the selected set according to their indices of real estate demand.

Yet another embodiment of the present disclosure provides a computer program product for machine learning predictive modeling comprising a persistent computer-readable storage media; first program code, stored on the computer-readable storage media, for aggregating sample data regarding a plurality of factors associated with employment and geographic location; second program code, stored on the computer-readable storage media, for performing iterative analysis on the sample data using machine learning to construct a predictive model; third program code, stored on the computer-readable storage media, for populating, using the predictive model, a database with predicted values of real estate demand for a selected set of predefined geographic regions; fourth program code, stored on the computer-readable storage media, for converting the predicted values of real estate demand in the database into percentages of observed values of real estate demand for geographic regions within the selected set over a specified time period to create indices of real estate demand; and fifth program code, stored on the computer-readable storage media, for rank ordering the geographic regions within the selected set according to their indices of real estate demand.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figures 1, 6:
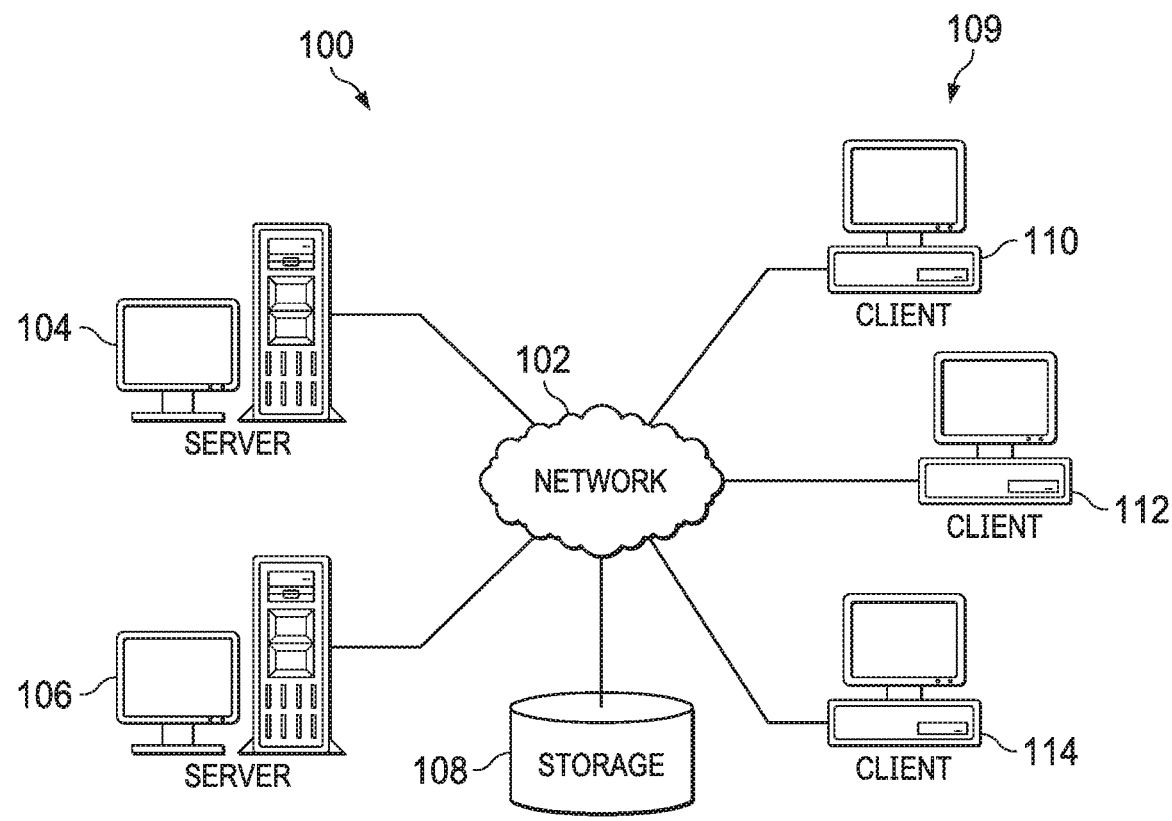
FIG. 1 is a pictorial representation of a network of data processing systems in which illustrative embodiments may be implemented.
FIG. 6 is an example table for use with a dataset in machine learning in accordance with an illustrative embodiment.

The illustrative embodiments recognize and take into account one or more different considerations. For example, the illustrative embodiments recognize and take into account that several factors affect real estate demand across different geographic regions.

The illustrative embodiments recognize and take into account that when a company prices a sale or lease of real estate, the company would like to know the size of their target demographic. The illustrative embodiments recognize and take into account that the company would like to understand trends over time within potential target locations. The illustrative embodiments recognize and take into account that it would be desirable to compare areas based on a point in time as well as trends over time to identify the best possible pricing for a sale or lease of real estate.

The illustrative embodiments recognize and take into account that decisions about real estate pricing are desirably made using the best possible information about the real estate demand for an area. Real estate companies would like to know what areas will be desired in order to best price real estate sales and rentals. Further, real estate companies would like to know the best times to place real estate on the market to secure the best price. The illustrative embodiments create indices to compare multiple time periods for real estate demand based on data including at least one of salaries, job types, industry/sector data, or trends generated from the data, such as housing pricing trends or employment trends.

The illustrative embodiments recognize and take into account that it would be desirable to create indices to compare multiple geographic areas based on industries, quantity of employees, job codes, and pay ranges. The illustrative embodiments recognize and take into account that it would be desirable to compare geographic areas based on a point in time as well as trends over time to help identify pricing for a particular location and as well as how pricing may change over time.

Thus, a method and apparatus that would allow for accurately analyzing real estate demand would fill a long-felt need in the field of real estate sales and real estate leasing. The illustrative embodiments create indices to compare geographic regions based on industries, quantity of employees, job codes, and pay ranges. By creating the indices, the illustrative embodiments accurately analyze geographic regions for real estate demand during specific time periods based on employment data.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
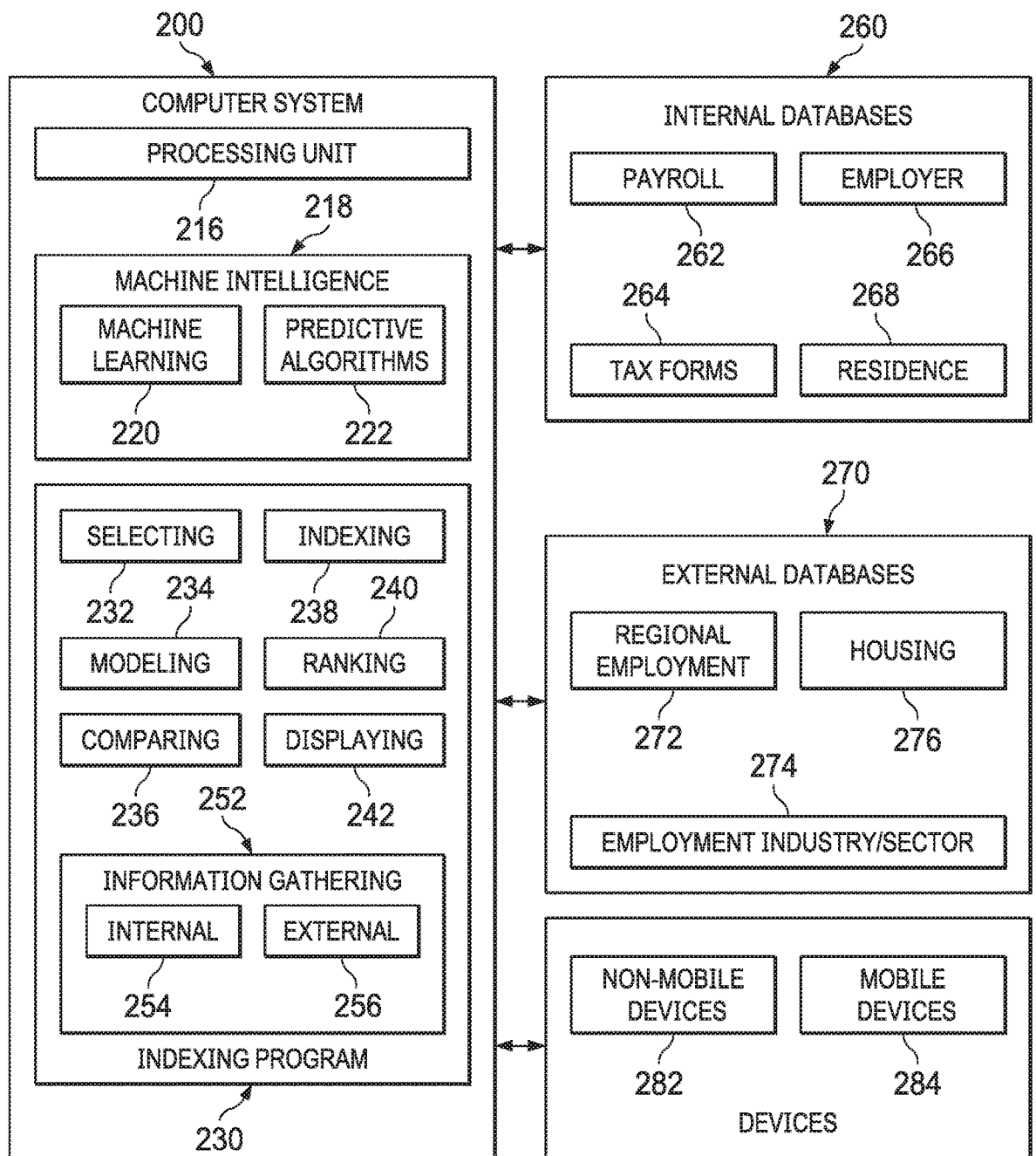
FIG. 2 is an illustration of a block diagram of a computer system for predictive modeling in accordance with an illustrative embodiment.

Turning to FIG. 2, a block diagram of a computer system for predictive modeling is depicted in accordance with an illustrative embodiment. Computer system 200 is connected to internal databases 260, external databases 270, and devices 280. Internal databases 260 comprise payroll 262, tax forms 264, employer information 266, and employee place of residence 268. External databases 270 comprise regional employment databases 272, employer industry/sector databases 274, and regional housing databases 276. Devices 280 comprise non-mobile devices 282 and mobile devices 284.

Computer system 200 comprises processing unit 216, machine intelligence 218, and indexing program 230. Machine intelligence 218 comprises machine learning 220 and predictive algorithms 222.

Machine intelligence 218 can be implemented using one or more systems such as an artificial intelligence system, a neural network, a Bayesian network, an expert system, a fuzzy logic system, a genetic algorithm, or other suitable types of systems. Machine learning 220 and predictive algorithms 222 may make computer system 200 a special purpose computer for dynamic predictive modelling of real estate demand according to geographic region. Machine learning 220 and predictive algorithms 222 may make computer system 200 a special purpose computer for dynamic predictive modelling of real estate demand according to a specific time period.

In an embodiment, processing unit 216 comprises one or more conventional general purpose central processing units (CPUs). In an alternate embodiment, processing unit 216 comprises one or more graphical processing units (GPUs). Though originally designed to accelerate the creation of images with millions of pixels whose frames need to be continually recalculated to display output in less than a second, GPUs are particularly well suited to machine learning. Their specialized parallel processing architecture allows them to perform many more floating point operations per second than a CPU, on the order of 1000× more. GPUs can be clustered together to run neural networks comprising hundreds of millions of connection nodes.

Indexing program 230 comprises information gathering 252, selecting 232, modeling 234, comparing 236, indexing 238, ranking 240, and displaying 242. Information gathering 252 comprises internal 254 and external 256. Internal 254 is configured to gather data from internal databases 260. External 256 is configured to gather data from external databases 270.

Thus, processing unit 216, machine intelligence 218, and indexing program 230 transform a computer system into a special purpose computer system as compared to currently available general computer systems that do not have a means to perform machine learning predictive modeling. Currently used general computer systems do not have a means to accurately predict real estate demand changes. Currently used general computer systems do not have a means to accurately predict real estate demand based on employment changes in a geographic region. Currently used general computer systems do not have a means to accurately predict real estate pricing based on employment in a geographic region.

Figure 3:
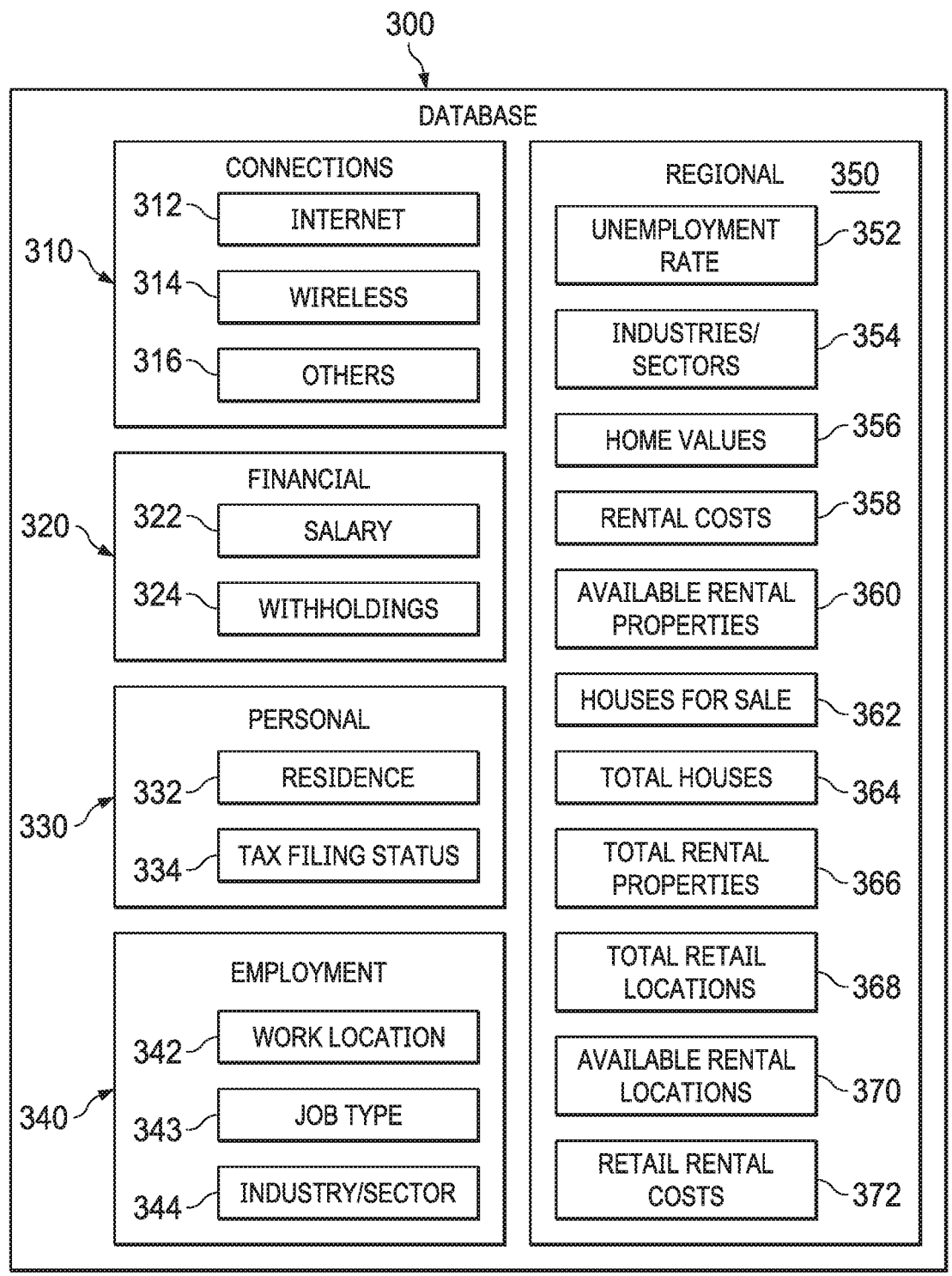
FIG. 3 is an illustration of a database for access by a predictive modeling application in accordance with an illustrative embodiment.

Turning to FIG. 3, a block diagram of a database is depicted in accordance with an illustrative embodiment. Database 300 comprises connections 310, financial data 320, personal data 330, and employment data 340. Connections 310 comprise internet 312, wireless 314, and others 316. Connections 310 may provide connectivity with internal databases 260, external databases 270, and devices 280 shown in FIG. 2. Internet 312 and wireless 314 as well as others 316 in connections 310 in FIG. 3 may connect with internal databases 260, external databases 270, and devices 280, shown in FIG. 2, through a network such as network 102 in FIG. 1. Others 316 may comprise any additional available means of connection other than internet 312 and wireless 314 such as a hard wired connection or a landline.

In an illustrative embodiment, financial data 320 comprises employee financial data, including employee salary 322 and withholdings 324. Information regarding employee salaries is maintained in salary 322. Information about the number and amount of deductions is maintained in withholdings 324.

Personal data 330 comprises employee personal information and employee personal data, including residence 332 and marital status 334. Information regarding the specific geographic region of employee residence is maintained in residence 332. The more specific and smaller the predefined region in questions (e.g., zip/postal code, state, multistate region, etc.), the more accurate the predictive model. Information about employee marital status is maintained in marital status 334. Marital status 334 can be extrapolated from tax filing status and/or from insurance and benefits forms.

Employment data 340 comprises work location 342, job type 343, and industry/sector 344. Information regarding the employee's office location (e.g., zip/postal code, state, multistate region, etc.) is maintained in work location 342. Information regarding the employee's position (e.g. job title, job code, assigned tasks, etc.) is maintained in job type 343. Information about the employer's industry/sector is maintained in industry/sector 344. A sector identifies a high-level group of related businesses. It can be thought of as a generic type of business. For example, the North American Industry Classification System (NAICS) uses a six digit code to identify an industry. The first two digits of that code identify the sector in which the industry belongs.

Regional data 350 comprises information about general economic trends within a predefined geographic region (e.g., zip/postal code, state, multistate region, etc.). Information regarding unemployment in the region is maintained in unemployment rate 352. Information regarding the types of industries/sectors within the region is maintained in industries/sectors 354. Information regarding home prices in the region is maintained in home values 356. Information regarding housing rental costs and rates for the region is maintained in rental costs 358. Information regarding the total quantity of rental properties available to rent is maintained in available rental properties 360. Information regarding the total quantity of houses currently on the market is maintained in houses for sale 362. Information regarding the total quantity of houses within the region is maintained in total houses 364. Information regarding the total quantity of rental properties within the region is maintained in total rental properties 366. Information regarding the total quantity of retail rental locations within the region is maintained in total retail locations 368. Information regarding the total quantity of retail rental properties available to rent is maintained in available retail locations 370. Information regarding retail rental prices in the region is maintained in retail rental costs 372.

The illustrations of the different components in FIGS. 2-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, internal databases 260 in FIG. 2 may have additional information other than payroll 262, tax forms 264, employer 266, and residence 268, all of which are in FIG. 2. In another illustrative example, database 300 in FIG. 3 may not have data for total retail locations 368, available retail locations 370, or retail rental costs 372.

Figure 4:
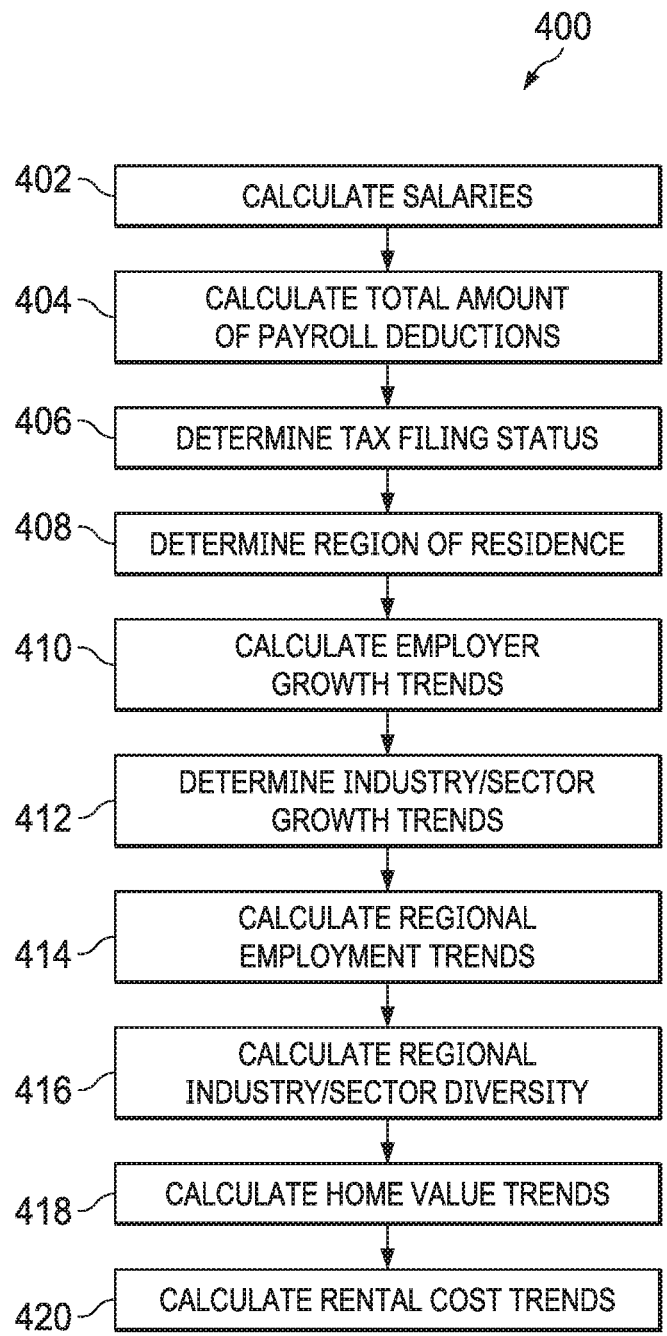
FIG. 4 is an illustration of a flowchart of a process for calculating factors used in predictive modeling in accordance with an illustrative embodiment.

Turning to FIG. 4, an illustration of a flowchart for calculating factors used in predictive modeling is depicted in accordance with an illustrative embodiment. This process can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, the process can be implemented by data processing system 800 in FIG. 8 and a processing unit such as processor unit 804 in FIG. 8.

It should be emphasized that the specific sequence of steps in the illustrative embodiment shown in FIG. 4 is chosen merely for convenience. The factors shown in FIG. 4 can be calculated independently in other orders or may be calculated in parallel by separate processors or processor threads, depending on the specific architecture of the computer system used. The factors in FIG. 4 are a non-limiting example of factors used in predicting a real estate demand. Other factors in addition to those displayed in FIG. 4 may be calculated. In some illustrative examples, one or more factors shown in FIG. 4 may not be calculated. In the illustrative embodiment, the factors in FIG. 4 are calculated using the information maintained in database 300 shown in FIG. 3.

Process 400 begins by calculating employee salary (step 402). Next, process 400 calculates a total amount of payroll deductions (step 404). These deductions can include retirement/savings, insurance deductions for family members, and similar items. Taking such withholdings into account gives a more accurate picture of employees' actual available funds for purchases and spending habits than simply nominal salary. Taking such withholdings into account gives a more accurate picture of employees' family size. The employees' family size can also influence the type and/or size of housing desired by an employee.

Next, process 400 determines tax filing status (step 406). The tax filing status (i.e. single or joint) can indicate the presence (or lack thereof) of more than one income within a household. The tax filing status can also influence the type of housing desired by an employee.

The illustrative examples can use the salary and income information for employees to better refine real estate demand to real estate demand for specific price ranges of housing. The illustrative examples can use the tax filing status for employees to better refine real estate demand for at least one of specific price ranges of housing or specific types of housing. For example, a greater quantity of single employees may indicate a greater quantity for smaller housing or for rental apartments.

Process 400 then determines a geographic region of residence (step 408). The size of the predefined region can vary in size (e.g., postal/zip code, city, state, multistate region, etc.). The smaller the region, the more precise the predictive model.

In some illustrative examples, process 400 calculates growth trends for the employee's employer over a specified time period (step 410). The growth trends for the employee's employer points to a potential increase or decrease in real estate demand for regions surrounding the work location of the employer. This also points to the probable future income of an employee beyond a snapshot of current salary. Is the employer hiring, downsizing, and/or automating? In addition, if a particular employer accounts for a significant percentage of employment in the predefined region in question (e.g., "factory town"), growth trends for that employer might have a disproportionate effect on the predictive model for that region.

In some illustrative examples, growth trends for the employer includes movement of employees between regions. In these illustrative examples, although the employer is not hiring or downsizing, movement of employees within the company to different work locations will influence the real estate demands in geographic regions losing or gaining residents.

In some illustrative examples, process 400 calculates growth trends over a specified time period for the industry/sector in which the employee is employed (step 412). This measure helps capture non-local economic factors that might impact the local regional economy but might not be properly accounted for in the predictive model if only local data were used.

In some illustrative examples, employment trends for the selected region are calculated for a specified time period (step 414). Again, trends provide better predictive modeling than a momentary snapshot. For example, a region (e.g., zip code, city) might have a relatively high real estate demand, but if unemployment in the area is on the rise, a predictive model that relied on that momentary current income or momentary employment would not be very accurate going forward. By utilizing employment trends for the selected region, a more accurate real estate demand can be predicted.

In some illustrative examples, process 400 calculates the diversity of industries/sectors within the selected region (step 416). This can include both the number of different industries/sectors in the region but also the percentages of employment for which they account. The diversity of industries/sectors of employment affects the potential upside or vulnerability of a region to trends in a particular industry/sector. Taken together with the other factors above, this measure can help the predictive model account for the interplay between local and non-local economic factors on the regional economy.

In some illustrative examples, after the geographic region is determined, home value trends within that region are determined (step 418). Home value can be both a measure of wealth as well as a measure of living costs. Generally, as home values increase, the income of the owners increases as well. However, some people buy the most expensive house lenders will allow, pushing the limits of their available cash flow. Furthermore, the wealth effect of home value can reverse in an economic downturn marked by falling home values. Therefore, calculating trends over specified time periods produces more accurate predictive models than looking at a snapshot of housing costs and home values at a given point in time.

In some illustrative examples, process 400 also calculates rental cost trends in the region (step 420). Like home values, rental costs are representative of living expenses and overall income and lifestyle. Again, calculating trends produces more accurate predictive modeling of how income and employment is trending in specific regions than a snapshot of rental costs at any given time.

The method of the present disclosure utilizes machine learning and predictive algorithms such as those provided by machine intelligence 218 in FIG. 2. Machine learning is a branch of artificial intelligence (AI) that enables computers to detect patterns and improve performance without direct programming commands. Rather than relying on direct input commands to complete a task, machine learning relies on input data. The data is fed into the machine, a predictive algorithm is selected, parameters for the data are configured, and the machine is instructed to find patterns in the input data through trial and error. The data model formed from analyzing the data is then used to predict future values.

Figure 5:
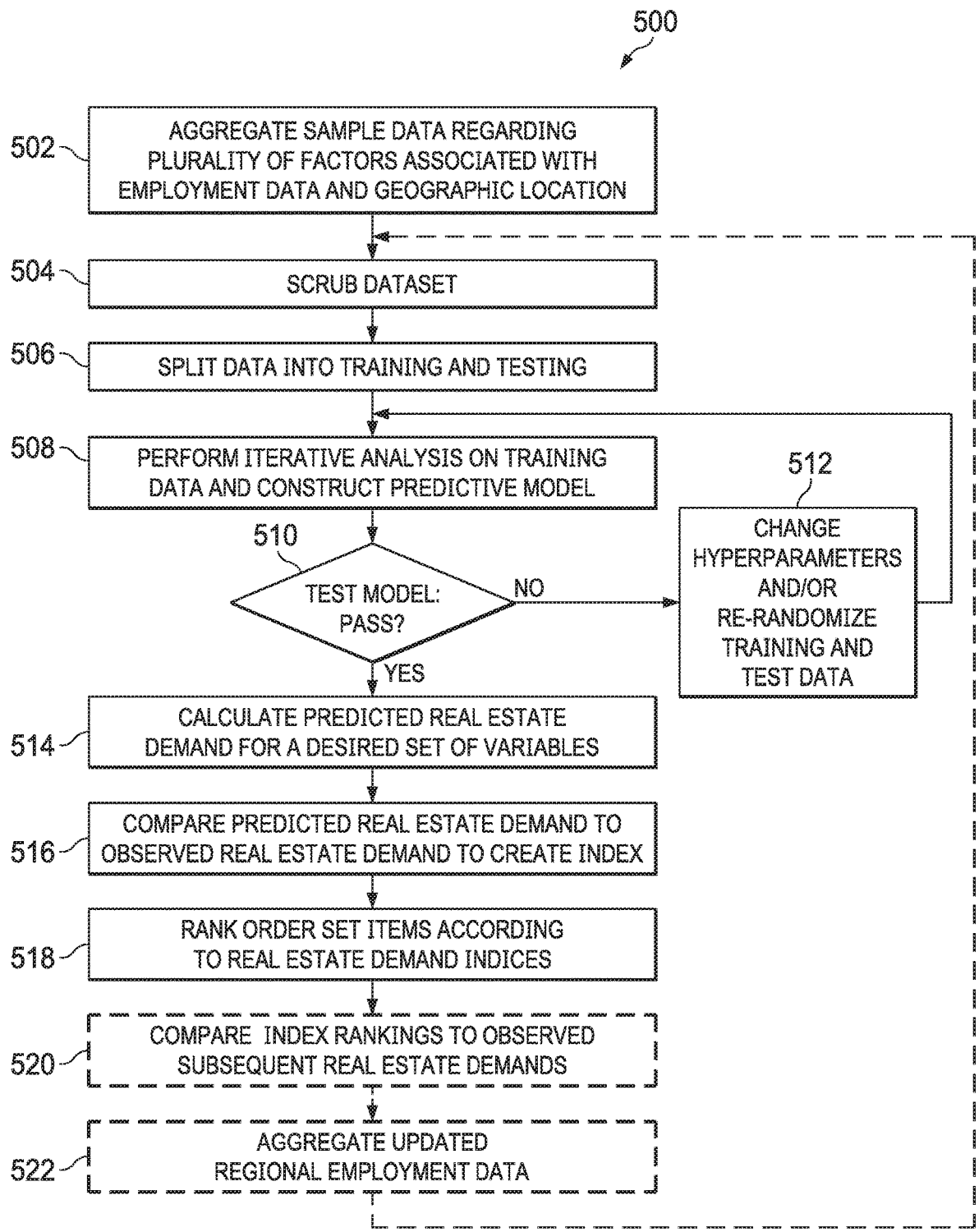
FIG. 5 is an illustration of a flowchart of a process for predictive modeling and indexing in accordance with an illustrative embodiment.

Turning to FIG. 5, an illustration of a flowchart of a process for predictive modeling and indexing is depicted in accordance with an illustrative embodiment. Process 500 can be implemented in software, hardware, or a combination of the two. When software is used, the software comprises program code that can be loaded from a storage device and run by a processor unit in a computer system such as computer system 200 in FIG. 2. Computer system 200 may reside in a network data processing system such as network data processing system 100 in FIG. 1. For example, computer system 200 may reside on one or more of server computer 104, server computer 106, client computer 110, client computer 112, and client computer 114 connected by network 102 in FIG. 1. Moreover, the process can be implemented by data processing system 800 in FIG. 8 and a processing unit such as processor unit 804 in FIG. 8.

Process 500 begins by aggregating sample data regarding a plurality of factors associated with employment data and geographic location (step 502). In some illustrative examples, process 500 aggregates the employment data and geographic location data associated with the factors determined in the process flow in FIG. 4. In some illustrative examples, process 500 aggregates only selected employment data and only selected geographic location data from FIG. 3.

Referring to FIG. 6, an example table for use with a dataset in machine learning is depicted in accordance with an illustrative embodiment. The dataset used to form predictions is defined and labeled in a table such as table 600. Each column is known as a vector, and the data within each column is a feature, also known as a variable, dimension, or attribute. Each row represents a single observation of a given feature and is referred to as a case or value. The y values represent the output and are typically expressed in the final column as shown. For ease of illustration, the example shown in FIG. 6 is a simple 2-D table, but it should be noted that multiples vectors (forming matrices) are typically used to represent large datasets. Referring back to FIG. 4, each category of data determined in the process flow could be represented by a separate vector (column) in a tabular dataset depending on how the data is aggregated.

After the dataset is aggregated, process 500 scrubs the dataset (step 504). Very large datasets, sometimes referred to as Big Data, often contain noise and complicated data structures. Bordering on the order of petabytes, such datasets comprise a variety, volume, and velocity (rate of change) that defies conventional processing and is impossible for a human to process without advanced machine assistance. Scrubbing refers to the process of refining the dataset before using it to build a predictive model and includes modifying and/or removing incomplete data or data with little predictive value. It can also entail converting text-based data into numerical values (one-hot encoding) or convert numerical values into a category.

Iterative analysis is performed on the sample data using machine learning to construct a predictive model. Preparation for and performance of the iterative analysis is performed in steps 506-512.

After the dataset has been scrubbed, process 500 divides the data into training data and test data to be used for building and testing the predictive model (step 506). To produce optimal results, the same data that is used to test the model should not be the same data used for training. The data is divided by rows, with 70-80% used for training and 20-30% used for testing. Randomizing the selection of the rows avoids bias in the model.

Process 500 then performs iterative analysis on the training data by applying predictive algorithms to construct a predictive model (step 508). There are three main categories of machine learning: supervised, unsupervised, and reinforcement. Supervised machine learning comprises providing the machine with test data and the correct output value of the data. Referring back to table 600 in FIG. 6, during supervised learning, the values for the y column (output) are provided along with the training data (labeled dataset) for the model building process in step 508. The algorithm, through trial and error, deciphers the patterns that exist between the input training data and the known output values to create a model that can reproduce the same underlying rules with new data. Examples of supervised learning algorithms include regression analysis, decisions trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data no one previously knew existed. Examples of algorithms used in unsupervised machine learning include k-means clustering (k-NN), association analysis, and descending clustering.

After the model is constructed, the test data is fed into the model to test its accuracy (step 510). In an embodiment, the model is tested using mean absolute error, which examines each prediction in the model and provides an average error score for each prediction. If the error rate between the training and test dataset is below a predetermined threshold, the model has learned the dataset's pattern and passed the test.

If the model fails the test, the hyperparameters of the model are changed and/or the training and test data are re-randomized, and the iterative analysis of the training data is repeated (step 512). Hyperparameters are the settings of the algorithm that control how fast the model learns patterns and which patterns to identify and analyze. Once a model has passed the test stage, it is ready for application.

Whereas supervised and unsupervised learning reach an endpoint after a predictive model is constructed and passes the test in step 510, reinforcement learning continuously improves its model using feedback from application to new empirical data. Algorithms such as Q-learning are used to train the predictive model through continuous learning using measurable performance criteria (discussed in more detail below).

After the model is constructed and tested for accuracy, process 500 uses the model to calculate predicted real estate demand for a desired set of variables, such as a selected set of predefined geographic regions or a selected set of time periods (step 514). When the selected set is of predefined geographic regions, the geographic regions include at least one of current geographic regions or potential geographic regions. In some illustrative examples, the geographic regions included in the set might have similar characteristics other than geographic proximity, such as, for example, population size and/or density, industry/sector distributions, urban, rural, technology companies, heavy industry, agriculture, etc.

The predicted real estate demand for the set is then converted into a percentage of observed values of real estate demand of the individual geographic regions or the individual time periods in the set to form an index (step 516). The index is calculated by dividing the observed value by the predicted value and then multiplying by 100. A percentage greater than 100% identifies a geographic region that has greater real estate demand than most geographic regions within the set. A percentage less than 100% identifies geographic regions that have lower real estate demand than most geographic regions within the set.

After the indices have been calculated, they are used to rank order the items of the set, either geographic regions or time periods (step 518). Rank order allows comparison of real estate demand between geographic regions that have similar characteristics, whichever characteristics those happen to be as determined by the modeler. The geographic regions with those characteristics that have the highest indices are likely to be the most lucrative target markets. When the set comprises time periods, rank order allows comparison of real estate demand between time periods for a geographic region.

If reinforcement learning is used with the predictive modeling, the real estate demand rankings are compared to the actual observed real estate demands over a subsequent time period (e.g., month, quarter, year, etc.) (step 520). The actual real estate demand levels for the set variables in question might not conform as expected to the relative index rankings. Furthermore, the sample data used to construct the predictive model might become outdated. Updated employment data is collected after the subsequent time period and fed back into the machine learning to update and modify the predictive model (step 522).

Figure 7:
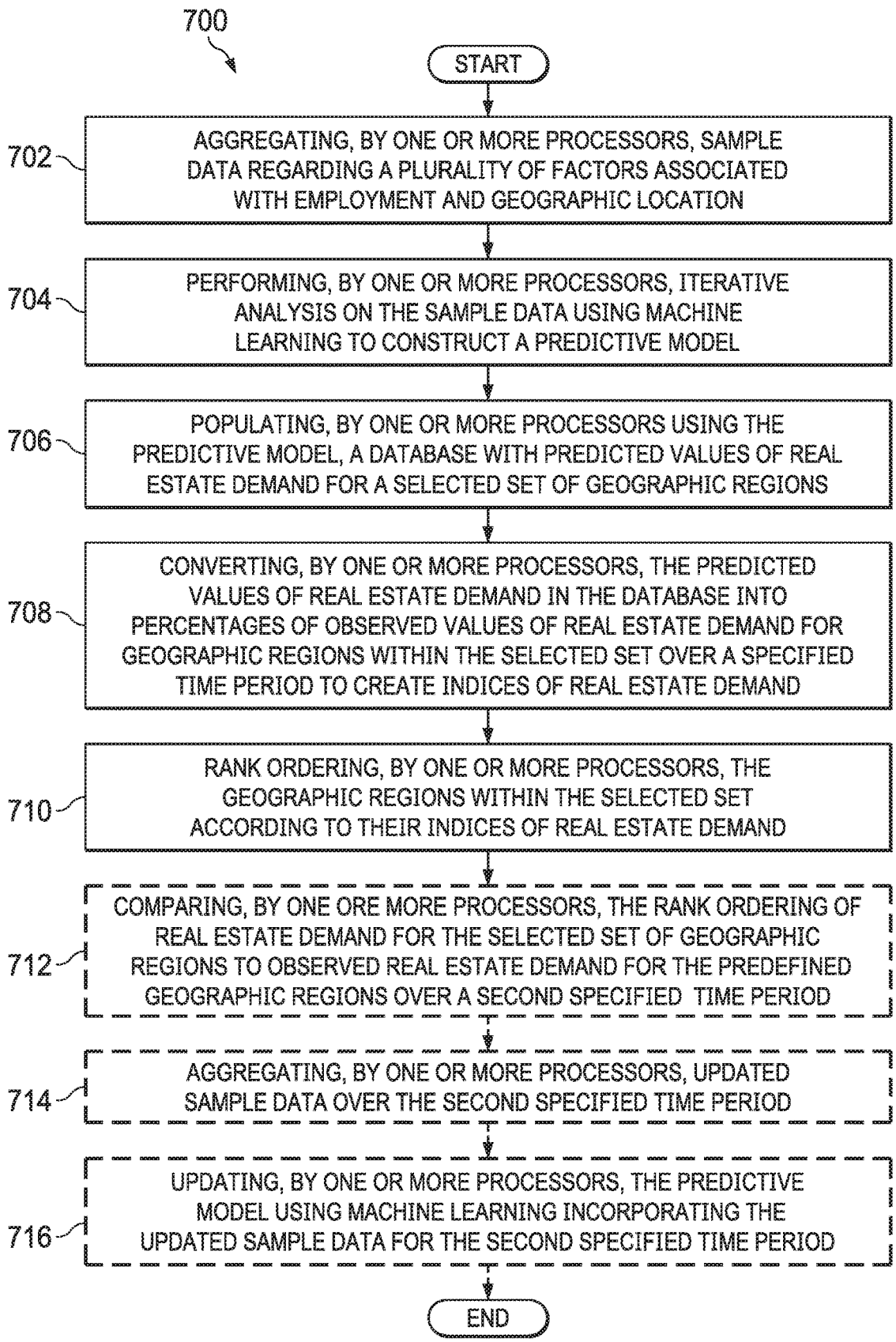
FIG. 7 is an illustration of a flowchart of a method for predictive modeling of real estate demand based on geographic region in accordance with an illustrative embodiment.

Turning to FIG. 7, an illustration of a flowchart of a method for predictive modeling of real estate demand based on geographic region is depicted in accordance with an illustrative embodiment. Method 700 can be implemented in software, hardware, or a combination of the two. When software is used, the software comprises program code that can be loaded from a storage device and run by a processor unit in a computer system such as computer system 200 in FIG. 2. Moreover, method 700 can be implemented by data processing system 800 in FIG. 8 and a processing unit such as processor unit 804 in FIG. 8.

Method 700 aggregates, by one or more processors, sample data regarding a plurality of factors associated with employment and geographic location (operation 702). The plurality of factors associated with employment and geographic location includes at least one of salary, total payroll deductions, tax filing status, job type, work location, region of residence, home values, rental costs, available rental properties, houses for sale, total houses, total rental properties, total retail locations, available retail locations, retail rental costs, employer growth trends, industry/sector growth trends, regional employment, or industry/sector diversity. In some illustrative examples, the plurality of factors associated with employment and geographic location are used to calculate additional elements such as disposable income, or any other desirable element in predicting values of a real estate demand.

Method 700 performs, by one or more processors, iterative analysis on the sample data using machine learning to construct a predictive model (operation 704). In some illustrative examples, the machine learning uses supervised learning to construct the predictive model. In some illustrative examples, the machine learning uses unsupervised learning to construct the predictive model. In some illustrative examples, the machine learning uses reinforcement learning to construct the predictive model.

Method 700 populates, by one or more processors using the predictive model, a database with predicted values of a real estate demand for a selected set of predefined geographic regions (operation 706). Real estate demand is a variable indicative of a value of available consumers for real estate. Real estate demand may take any desirable form. In some illustrative examples, real estate demand may be expressed as a percentage increase or decrease over a previous time period. In some illustrative examples, real estate demand may be expressed as a quantity of consumers. In some illustrative examples, real estate demand may be expressed as a ratio of consumers to sellers. Real estate demand may be expressed as a dimensionless quantity, such as an "intensity."

In some illustrative examples, real estate demand is a residential real estate demand. In some illustrative examples, real estate demand is a home purchasing demand. In some illustrative examples, real estate demand is a rental demand. In some illustrative examples, real estate demand is a retail real estate demand.

Method 700 converts, by one or more processors, the predicted values of a real estate demand in the database into percentages of observed values of real estate demand for geographic regions within the selected set over a specified time period to create indices of real estate demand (operation 708). Method 700 rank orders, by one or more processors, the geographic regions within the selected set according to their indices of real estate demand (operation 710). Afterwards, method 700 terminates.

In some illustrative examples, method 700 compares, by one or more processors, the rank ordering of real estate demand for the selected set of predefined geographic regions to observed real estate demand for the predefined geographic regions over a second specified time period (operation 712). In these illustrative examples, method 700 aggregates, by one or more processors, updated sample data over the second specified time period (operation 714). In these illustrative examples, method 700 updates, by one or more processors, the predictive model using machine learning incorporating the updated sample data for the second specified time period (operation 716).

The illustrative embodiments thus produce the technical effect of constructing accurate, complex predictive models from large datasets and do so in a timely manner in the face of rapidly changing empirical data. The illustrative embodiments produce the technical effect of constructing accurate, complex predictive models that predict values of real estate demand for geographic regions. The predictive models take into account at least one of changes in employment in the region, changes in employment in specific industries in the region, changes in job types in the region, or changes in salary in the region. In some illustrative examples, the predictive models take into account increases or decreases in a quantity of employees in the region. In some illustrative examples, the predictive models take into account increases or decreases in a quantity of employees in a specific industry in the region.

In some illustrative examples, the predictive models also take into account a quantity of available housing within the region. In some illustrative examples, the predictive models take into account at least one of the total quantity of houses, the total quantity of rental properties, the quantity of houses for sale, or the quantity of rental properties available.

In some illustrative examples, the predictive models predict values of residential real estate demand for geographic regions. In some illustrative examples, the predictive models predict values of retail real estate demand for geographic regions.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

Figure 8:
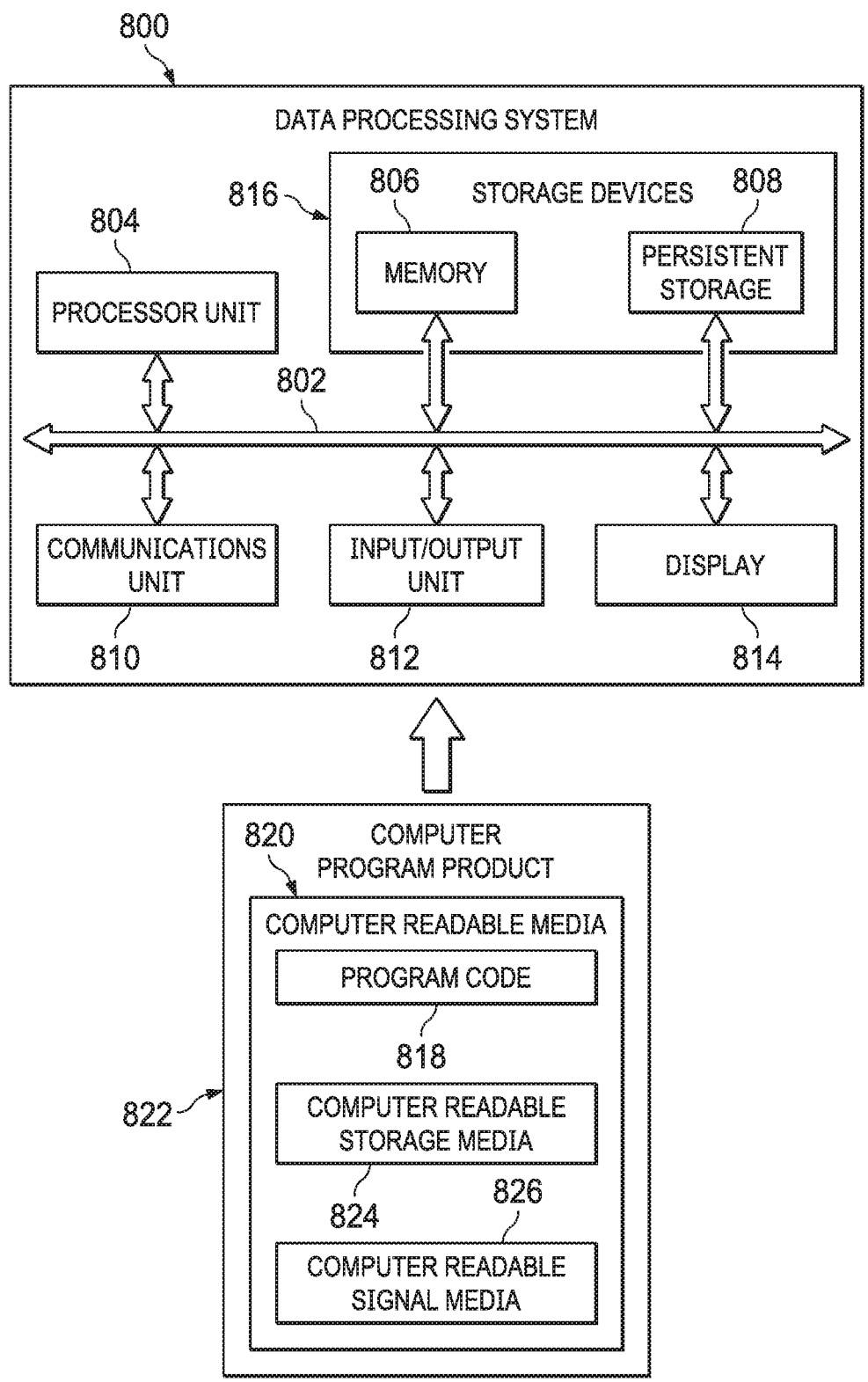
FIG. 8 is an illustration of a block diagram of a data processing system in accordance with an illustrative embodiment.

Turning now to FIG. 8, an illustration of a block diagram of a data processing system is depicted in accordance with an illustrative embodiment. Data processing system 800 may be used to implement one or more of server computer 104 in FIG. 1, server computer 106 in FIG. 1, client devices 109 in FIG. 1, or computer system 200 in FIG. 2. In this illustrative example, data processing system 800 includes communications framework 802, which provides communications between processor unit 804, memory 806, persistent storage 808, communications unit 810, input/output unit 812, and display 814. In this example, communications framework 802 may take the form of a bus system.

Processor unit 804 serves to execute instructions for software that may be loaded into memory 806. Processor unit 804 may be a number of processors, a multi-processor core, or some other type of processor, depending on the particular implementation. In an embodiment, processor unit 804 comprises one or more conventional general purpose central processing units (CPUs). In an alternate embodiment, processor unit 804 comprises one or more graphical processing units (CPUs).

Memory 806 and persistent storage 808 are examples of storage devices 816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 816 may also be referred to as computer-readable storage devices in these illustrative examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that may be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs may be located in storage devices 816, which are in communication with processor unit 804 through communications framework 802. The processes of the different embodiments may be performed by processor unit 804 using computer-implemented instructions, which may be located in a memory, such as memory 806.

These instructions are referred to as program code, computer-usable program code, or computer-readable program code that may be read and executed by a processor in processor unit 804. The program code in the different embodiments may be embodied on different physical or computer-readable storage media, such as memory 806 or persistent storage 808.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818. Alternatively, program code 818 may be transferred to data processing system 800 using computer-readable signal media 826.

Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 8 can be varied from the illustrative examples shown. The different embodiments may be implemented using any hardware device or system capable of running program code 818.

Thus, the illustrative examples provide a method, computer system, and computer program product that can be used in decision making regarding pricing for real estate. The illustrative examples provide a method, computer system, and computer program product that can be used in decision making regarding timing for listing real estate. More specifically, the illustrative examples provide a method, computer system, and computer program product that predictively model the real estate demand for a geographic region for a designated time period.

In one illustrative example, one or more technical solutions are present that overcome a technical problem with the conventionally subjective analysis utilized to project future pricing of real estate. In one illustrative example, one or more technical solutions are present that overcome a technical problem with the conventionally subjective analysis utilized in setting pricing for real estate. In another illustrative example, one or more technical solutions are present that overcome a technical problem with the conventionally subjective analysis utilized in selecting a time period for listing real estate. As a result, one or more technical solutions may provide a technical effect of at least one of increasing speed, reducing cost, or reducing errors in real estate pricing. One or more technical solutions are presented in which predictive modeling is utilized to objectively analyze geographic regions and/or time periods for real estate using a real estate demand.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for predictive modeling, the method comprising:
   aggregating, by one or more processors, sample data regarding a plurality of factors associated with employment and geographic location;
   scrubbing, by one or more processors, the sample data;
   performing, by one or more processors, iterative analysis on the sample data using machine learning to construct a predictive model, wherein the iterative analysis comprises:
      randomly dividing, by one or more processors, the sample data into a training subset and a test subset;
      applying, by one or more processors, the training subset in machine learning to construct the predictive model;
      applying, by one or more processors, the test subset to the predictive model to generate test results;
      determining, by one or more processors, whether the test results meet a desired accuracy, and;
      responsive to determining that the test results do not meet the desired accuracy, repeating, by one or more processors, the iterative analysis;
   populating, by one or more processors using the predictive model, a database with predicted values of a real estate demand for a selected set of predefined geographic regions;
   converting, by one or more processors, the predicted values of a real estate demand in the database into percentages of observed values of real estate demand for geographic regions within the selected set over a specified time period to create indices of real estate demand; and
   rank ordering, by one or more processors, the geographic regions within the selected set according to their indices of real estate demand.

2. The method according to claim 1, further comprising:
   comparing, by one or more processors, the rank ordering of real estate demand for the selected set of predefined geographic regions to observed real estate demand for the predefined geographic regions over a second specified time period;
   aggregating, by one or more processors, updated sample data over the second specified time period; and
   updating, by one or more processors, the predictive model using machine learning incorporating the updated sample data for the second specified time period.

3. The method according to claim 1, wherein categories of the sample data applied to the machine learning to construct the predictive model include:
   at least one of:
      salary;
      total payroll deductions; or
      tax filing status; and
   at least one of:

job type;
work location;
region of residence;
home values;
rental costs;
available rental properties;
houses for sale;
total houses;
total rental properties;
total retail locations;
available retail locations;
retail rental costs;
employer growth trends;
industry/sector growth trends;
regional employment; or
industry/sector diversity.

4. The method according to claim 1, wherein the machine learning uses supervised learning to construct the predictive model.

5. The method according to claim 1, wherein the machine learning uses unsupervised learning to construct the predictive model.

6. The method according to claim 1, wherein the machine learning uses reinforcement learning to construct the predictive model.

7. A machine learning predictive modeling system, comprising:
a computer system; and
one or more processors running on the computer system, wherein the one or more processors are operable to,
aggregate sample data regarding a plurality of factors associated with employment and geographic location;
scrub the sample data;
perform iterative analysis on the sample data using machine learning to construct a predictive model, wherein the iterative analysis comprises:
randomly dividing the sample data into a training subset and a test subset;
applying the training subset in machine learning to construct the predictive model:
applying the test subset to the predictive model to generate test results;
determining whether the test results meet a desired accuracy, and
responsive to determining that the test results do not meet the desired accuracy, repeating the iterative analysis;
populate, using the predictive model, a database with predicted values of real estate demand for a selected set of predefined geographic regions;
convert the predicted values of real estate demand in the database into percentages of observed values of real estate demand for geographic regions within the selected set over a specified time period to create indices of real estate demand; and
rank order the geographic regions within the selected set according to their indices of real estate demand.

8. The machine learning predictive modeling system according to claim 7, wherein the one or more processors running on the computer system compare the rank ordering of real estate demand for the selected set of predefined geographic regions to observed real estate demand for said geographic regions over a second specified time period; aggregate updated sample data over the second specified time period; and update the predictive model using machine learning incorporating the updated sample data for the second specified time period.

9. The machine learning predictive modeling system according to claim 7, wherein the one or more processors comprise aggregated graphical processor units (GPU).

10. The machine learning predictive modeling system according to claim 7, wherein the machine learning uses supervised learning to construct the predictive model.

11. The machine learning predictive modeling system according to claim 7, wherein the machine learning uses unsupervised learning to construct the predictive model.

12. The machine learning predictive modeling system according to claim 7, wherein the machine learning uses reinforcement learning to construct the predictive model.

13. A computer program product for machine learning predictive modeling, the computer program product comprising:
a persistent computer-readable storage media;
program code, stored on the computer-readable storage media, for aggregating sample data regarding a plurality of factors associated with employment and geographic location;
program code, stored on the computer-readable storage media, for scrubbing, by one or more processors, the sample data;
program code, stored on the computer-readable storage media, for performing iterative analysis on the sample data using machine learning to construct a predictive model, wherein the iterative analysis comprises:
randomly dividing the sample data into a training subset and a test subset;
applying the training subset in machine learning to construct the predictive model;
applying the test subset to the predictive model to generate test results;
determining whether the test results meet a desired accuracy, and
responsive to determining that the test results do not meet the desired accuracy, repeating the iterative analysis;
program code, stored on the computer-readable storage media, for populating, using the predictive model, a database with predicted values of real estate demand for a selected set of predefined geographic regions;
program code, stored on the computer-readable storage media, for converting the predicted values of real estate demand in the database into percentages of observed values of real estate demand for geographic regions within the selected set over a specified time period to create indices of real estate demand; and
program code, stored on the computer-readable storage media, for rank ordering the geographic regions within the selected set according to their indices of real estate demand.

14. The computer program product according to claim 13, further comprising:
program code, stored on the computer-readable storage media, for comparing the rank ordering of real estate demand for the selected set of predefined geographic regions to observed real estate demand for said geographic regions over a second specified time period;
program code, stored on the computer-readable storage media, for aggregating updated sample data over the second specified time period; and
program code, stored on the computer-readable storage media, for updating the predictive model using machine learning incorporating the updated sample data for the second specified time period.

15. The computer program product according to claim 13, wherein categories of the sample data applied to the machine learning to construct the predictive model include:
at least one of:
salary;
total payroll deductions; or
tax filing status; and
at least one of:
job type;
work location;
region of residence;
home values;
rental costs;
available rental properties;
houses for sale;
total houses;
total rental properties;
total retail locations;
available retail locations;
retail rental costs;
employer growth trends;
industry/sector growth trends;
regional employment; or
industry/sector diversity.

16. The computer program product according to claim 13, wherein the machine learning uses supervised learning to construct the predictive model.

17. The computer program product according to claim 13, wherein the machine learning uses unsupervised learning to construct the predictive model.

18. The computer program product according to claim 13, wherein the machine learning uses reinforcement learning to construct the predictive model.

* * * * *